| United States Patent [19] | [11] Patent Number: 4,849,458 |
| Reed et al. | [45] Date of Patent: Jul. 18, 1989 |

[54] SEGMENTED POLYETHER POLYURETHANE

[75] Inventors: Andrew M. Reed; Ian N. Askill, both of Arvada; Willis W. Weber, Morrison, all of Colo.

[73] Assignee: Matrix Medica, Inc., Wheat Ridge, Colo.

[21] Appl. No.: 208,153

[22] Filed: Jun. 17, 1988

[51] Int. Cl.[4] ............................................. C08G 18/14
[52] U.S. Cl. ..................................... 521/159; 528/59; 528/61
[58] Field of Search ...................... 521/159; 528/59, 61

[56] References Cited

U.S. PATENT DOCUMENTS 3,963,681  6/1976  Kaneko et al. ..................... 528/61

Primary Examiner—Maurice J. Welsh
Attorney, Agent, or Firm—Dressler, Goldsmith, Shore, Sutker & Milnamow, Ltd.

[57] ABSTRACT

A hydrophilic, segmented polyether polyurethane-urea that exhibits an increase in tensile strength and elongation when wet with water and is capable of forming visually clear films permeable to water vapor is disclosed.

10 Claims, 8 Drawing Sheets

FIG_3_

FIG_4_

FIG_9_

FIG_10_

SEGMENTED POLYETHER POLYURETHANE

DESCRIPTION

TECHNICAL FIELD

This invention relates to a segmented polyether polyurethane-urea resin having certain controlled physical properties, and in particular to a segmented polyether polyurethane-urea resin that exhibits an increase in tensile strength and elongation when wet with water and that can be formed into a visually clear film that is permeable to water vapor and is hydrophilic.

BACKGROUND OF THE INVENTION

Segmented polyurethanes are prepared from hydroxyl terminated low molecular weight polyethers or polyesters or mixtures thereof by reacting these materials with a stoichiometric excess of a diisocyanate to produce an isocyanate terminated prepolymer. This reactive prepolymer is then chain extended with a difunctional compound containing an active hydrogen such as water, glycols, aminoalcohols or diamines.

Diamine-extended polyurethanes have a relatively high urea linkage content due to their diamine extension. This high urea linkage content results in relatively high levels of hydrogen bonding which, in turn, produces strong elastic materials with good flex life properties. However, this high level of hydrogen bonding renders the polyurethane non-thermoplastic. This non-thermoplastic nature severely restricts the processes which may be utilized to fabricate these polyurethanes into useful devices. Techniques such as extrusion, injection molding and heat sealing cannot be utilized due to the polyurethanes' inability to melt and flow prior to decomposition.

Segmented polyurethanes have also been synthesized utilizing relatively low molecular weight diols as chain extension agents. The use of diols produces a segmented polyurethane having reduced levels of hydrogen bonding. As a result of this reduction in hydrogen bonding, these particular polyurethanes have reduced physical properties such as elongation, ultimate tensile strength and flex life as compared to their equivalent diamine extended counterparts. However, this relatively lower level of hydrogen bonding renders the polyurethane thermoplastic and allows it to be extruded, injection molded, heat sealed, etc.

It is known that the mechanical properties and predominately the elastic properties of linear segmented polyurethane block copolymers arise from a two phase microstructure. This two phase structure is derived from the individual chain structure of the polyurethane.

Segmented polyurethane polymer chains may be considered as a series of alternating "soft" and "hard" blocks. Typically, the "soft" blocks are diisocyanate-coupled relatively low melting point polyester or polyether polymers of relatively low molecular weight. The "hard" blocks include single diurethane linkages resulting when a diisocyanate molecule couples two polyester or polyether molecules. More particularly, they are the relatively higher melting urethane or urea chain segments formed by the reaction of diisocyanate with a glycol and/or a diamine chain extender.

The polar nature of the recurring rigid "hard" urethane/urea chain segments results in their strong mutual attraction. This attraction (both inter- and intra-molecular) leads to aggregation and ordering into crystalline and paracrystalline domains (also called pseudo crystalline domains) in a mobile polymer matrix. The high level of urethane and urea hydrogen atoms together with carbonyl and ether oxygen groups permits extensive hydrogen bonding in these systems. The level of this hydrogen bonding restricts the mobility of chain segments to organize extensively into crystalline lattices. The result is a polymer system in which there are at least three levels of association.

Portions of "hard" blocks form discernible crystalline domains while portions of the "soft" blocks form the basis for an amorphous polymer matrix. There is, however, at least a third "phase" which is formed from the complex interaction of paracrystallinity and hydrogen bonding. This leads to the formation of what has been described as "pseudo crosslinks". That is, primary polyurethane chains are crosslinke in effect, but not in fact. The overall consequence is the formation of a labile network of polymer chains which display many of the mechanical, chemical and physical properties of truly crosslinked networks. This type of "pseudo crosslinking" may be partially reversed or enhanced by heat and solvation.

Extrudable, water-extended polytetramethylene ether polyurethane-urea resins are described in Gilding U.S. Pat. No. 4,062,834 et al. The described resins have been rendered extrudable by a reduction and rearrangement of the hydrogen bonds in the polymer chain. This is accomplished by reacting the isocyanate terminated prepolymer with water to form an unstable carbamate which in turn decomposes to form an amine and carbon dioxide. The so formed amine terminated prepolymer is then reacted with another molecule of isocyanate terminated prepolymer. The polyurethanes thus produced prove to be thermoplastic; however, the physical properties such as elongation, ultimate tensile strength and flex life are inferior.

U.S. Patent No. 3,635,907 to Schulze, et al. discloses a polyurethane wherein a mixture of chain extenders such as diamines, hydrazine, or hydrazine derivatives, and aminoalcohols is utilized for chain extension, followed by further addition of a diisocyanate and a diol. The ultimate tensile strength of the polyurethane is varied by varying the quantity of diisocyanate added (column 4, lines 8–11). The reaction between the chain extenders and the NCO-groups of the prepolymer is terminated by the addition of aliphatic alcohols (column 1, lines 70–72). Films produced from polyurethanes derived from linear polyesters admixed with relatively low molecular weight aliphatic diols are said to be nonporous and impermeable to water vapor (column 2, lines 27–28).

The present invention provides segmented polyether polyurethane-urea resins which have superior physical properties such as an increase in strength when wet with water, elongation, ultimate tensile strength, and flex life. Some of the present resins may be readily extruded, injection molded and heat sealed, and can be made into visually clear films that are hydrophilic and are permeable to water vapor. Such films are eminently well suited for the fabrication of wound dressings.

SUMMARY OF THE INVENTION

The present invention contemplates a hydrophilic, segmented polyether polyurethane-urea that exhibits an increase in tensile strength and elongation when wet with water, and that is capable of forming a visually clear film. In addition, films embodying this invention exhibit a moisture vapor transport rate several orders of magnitude higher than that of silicone-derived films. This polyurethane-urea is a reaction product of a diisocyanate-polyalkylene ether glycol mixture prepolymer chain extended with a difunctional amine chain extender such as an aliphatic diamine and/or an alkanolamine.

More particularly, segmented polyurethane-urea resins of the present invention are derived from a prepolymer formed from a diisocyanate reacted with a certain mixture of polyalkylene ether glycols to form an isocyanate-terminated prepolymer. The polyalkylene ether glycols selected for the mixture have repeating alkyleneoxy segments of unequal lengths. That is, a polyalkylene ether glycol having relatively longer alkyleneoxy segments is mixed with at least one other polyalkylene ether glycol having relatively shorter alkyleneoxy segments. This prepolymer is then chain extended to a desired, relatively higher, number average molecular weight, usually in the range of about 20,000 to about 260,000, by reaction with an admixture of at least one difunctional chain extender, such as an aliphatic diamine, and preferably admixed with at least one chain control agent such as a monofunctional amine. Optionally, a polymeric wetting agent such as polyvinylpyrrolidone or the like is also present.

Control of the hydrophilicity of the present polyurethane-urea resins can be done intrinsically by selecting a desired mixture of polyalkylene ether glycols and by adjusting the ratio of these polyalkylene ether glycols as the prepolymer of the resin is made. Hydrophilicity of the resin can also be controlled extrinsically by incorporation into the prepared resin of a hydrophilic polymer that is soluble in the segmented polyurethane resin, e.g., polyvinylpyrrolidone. As the degree of hydrophilicity is varied, the rate of moisture transport and vapor permeability through the present polyurethanes are also varied.

The present polyurethane-urea resins can be processed into porous films or membranes, if desired, in accordance with practices taught in Gilding U.S. Pat. No. 4,704,130 et al. Such porous films have utility as membranes for various separation processes, for wound dressings, and the like.

Numerous other advantages and features of the present invention will become readily apparent from the following detailed description of invention, the accompanying examples and the appended claims.

BRIEF DESCRIPTION OF DRAWINGS

In the drawings,

In FIGS. 1, 3, 5, 7, 9, 11, 13 and 15 all variables except the coordinate variables were held at their mean experimental values, and in FIGS. 2, 4, 6, 8, 10, 12 and 14 all variables except the coordinate variables were held at about their optimum values.

The mean experimental values were as follows:

| | |
|---|---|
| mole percent polyethylene glycol (PEG) | 49.026 |
| molecular weight of PEG | 1426 |
| molecular weight of polytetramethylene glycol (PTMEG) | 1268.2 |
| extension | 23.776 |
| mole fraction ethylene diamine (EDA) | 0.49026 |

The optimum values were as follows:

| The optimum values were as follows: | |
|---|---|
| mole percent PEG | 25 |
| molecular weight of PEG | 2000 |
| molecular weight of PTMEG | 2000 |
| extension | 40 |
| mole fraction of EDA | 0.5 |

DETAILED DESCRIPTION OF THE PREFERRED EMBODIMENTS

Figure 1:
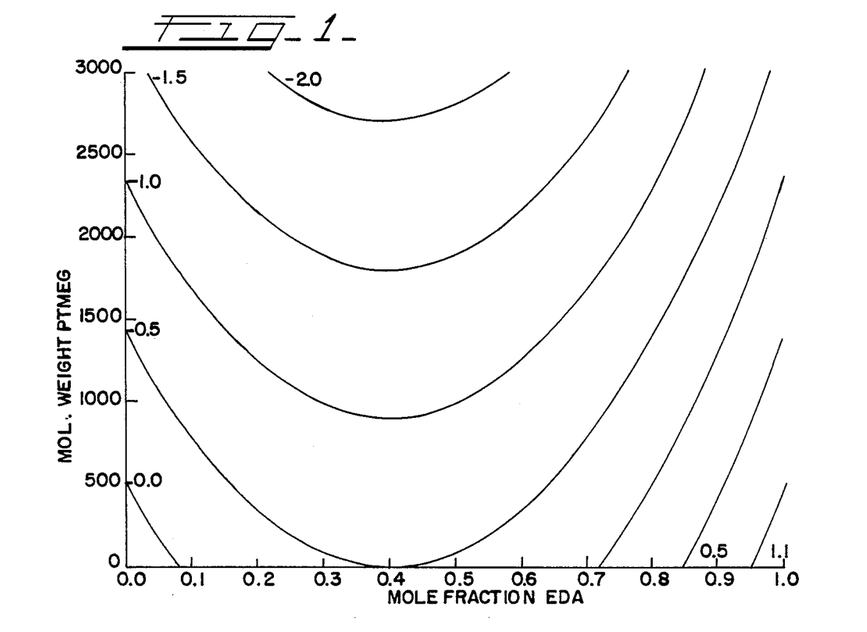
FIGS. 1 through 15 are graphical representations showing constant dry tensile strength —wet tensile strength differential contours (expressed in kilograms per square millimeter) derived from a multiple regression model of experimental data.
Figure 2:
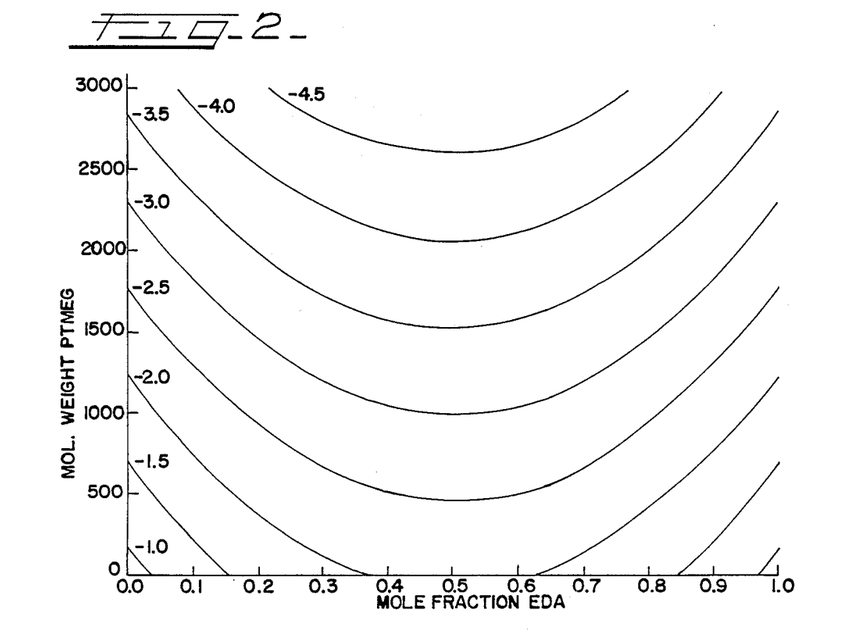
Figure 3:
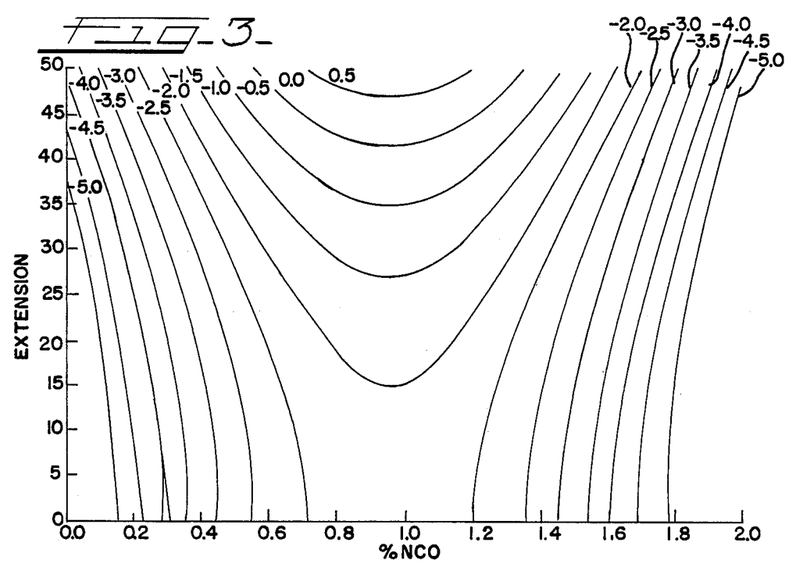
Figure 4:
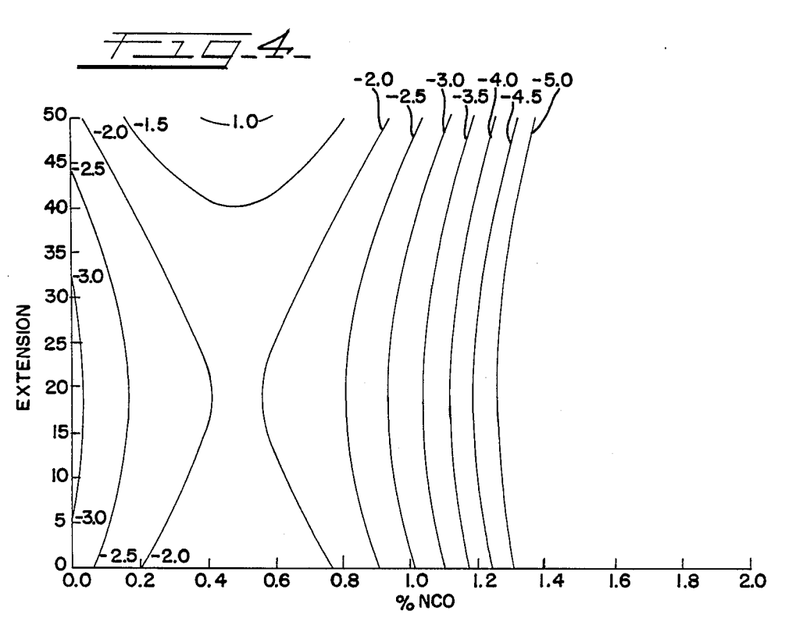
Figure 5:
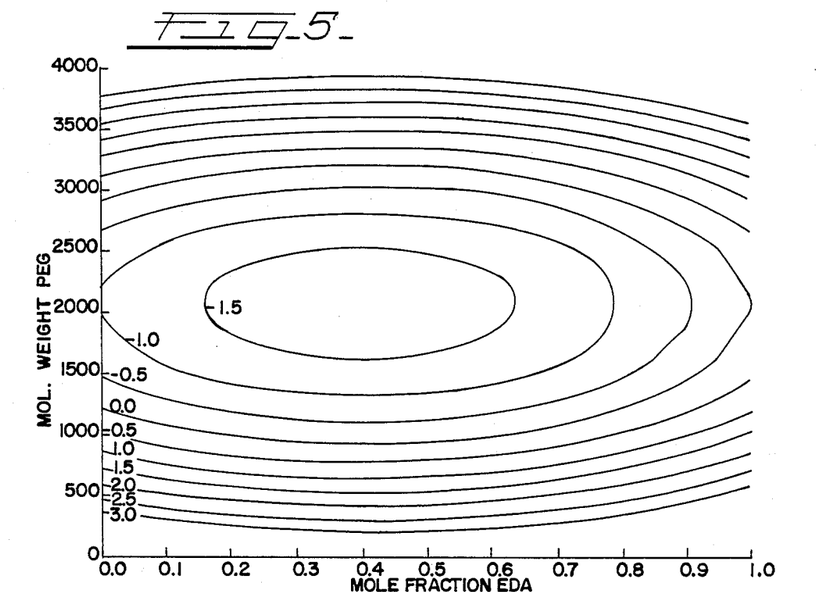
Figure 6:
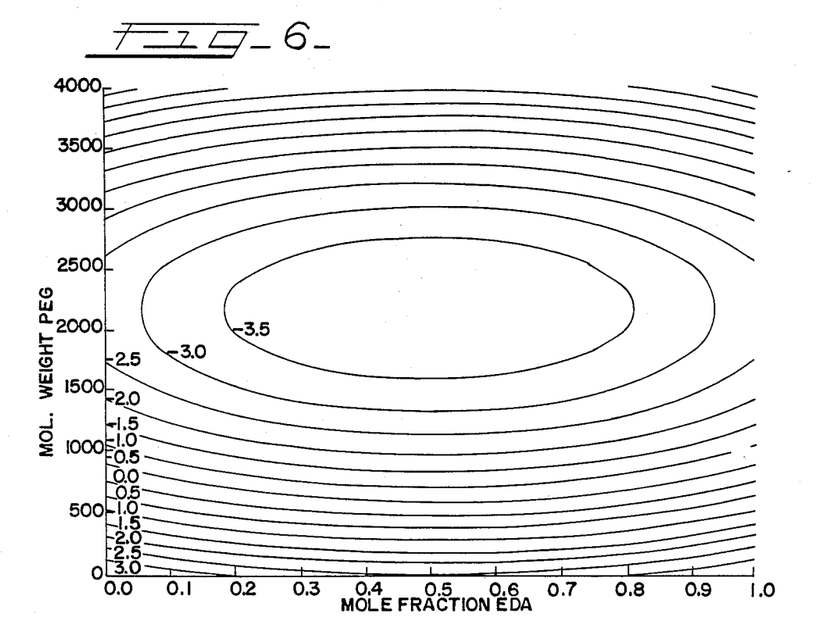
Figure 7:
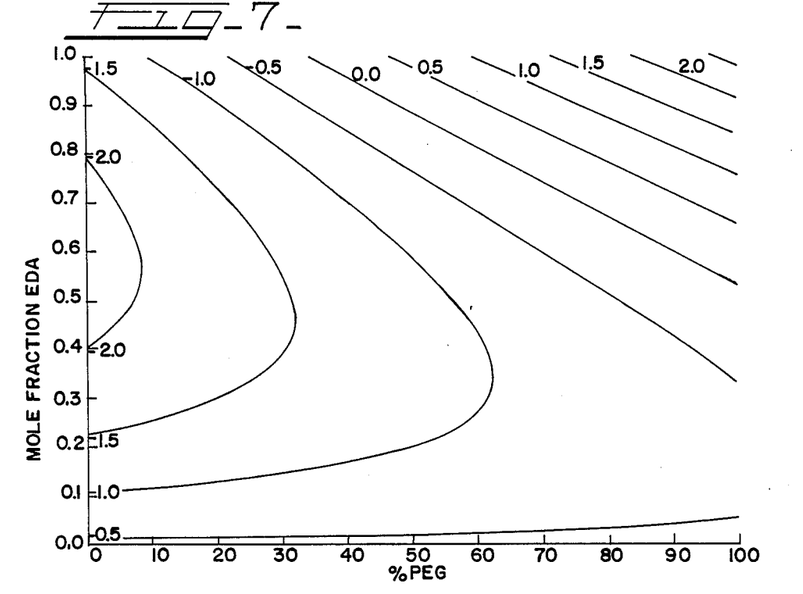
Figure 8:
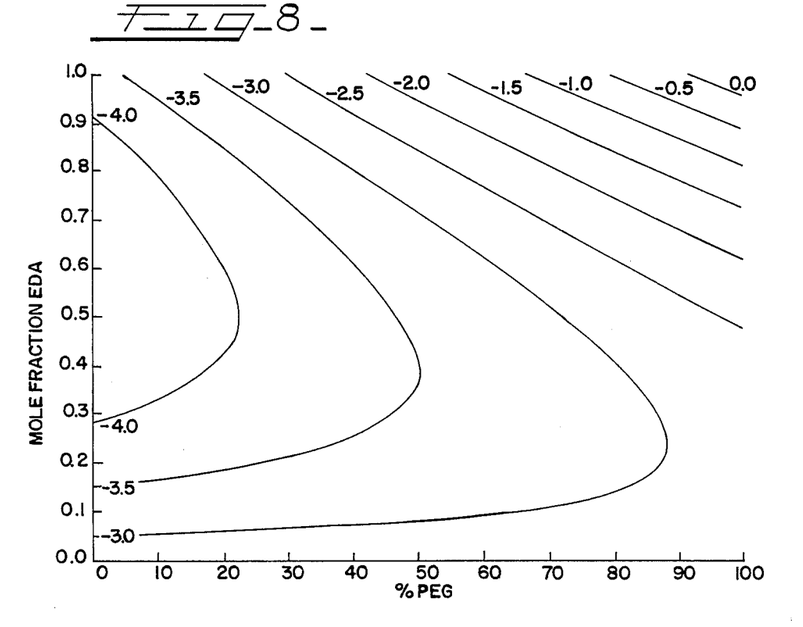
Figure 9:
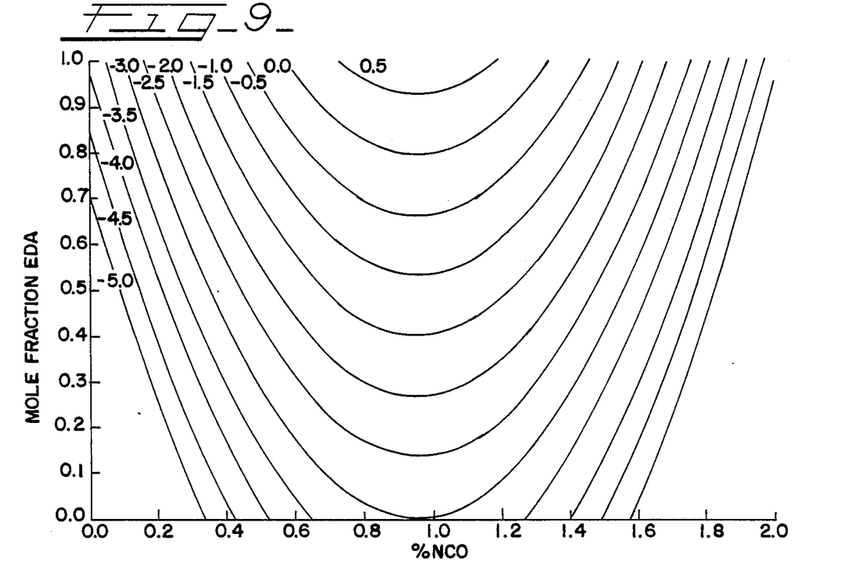
Figure 10:
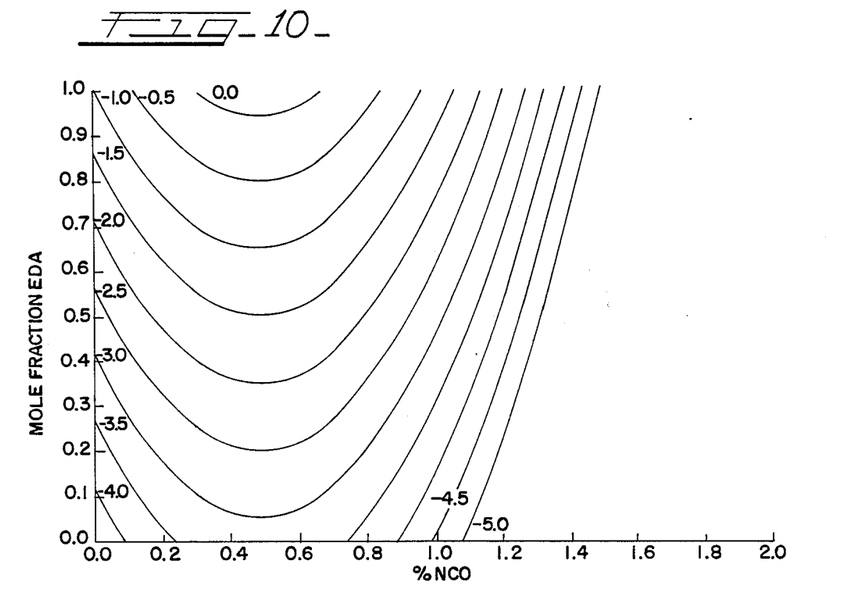
Figure 11:
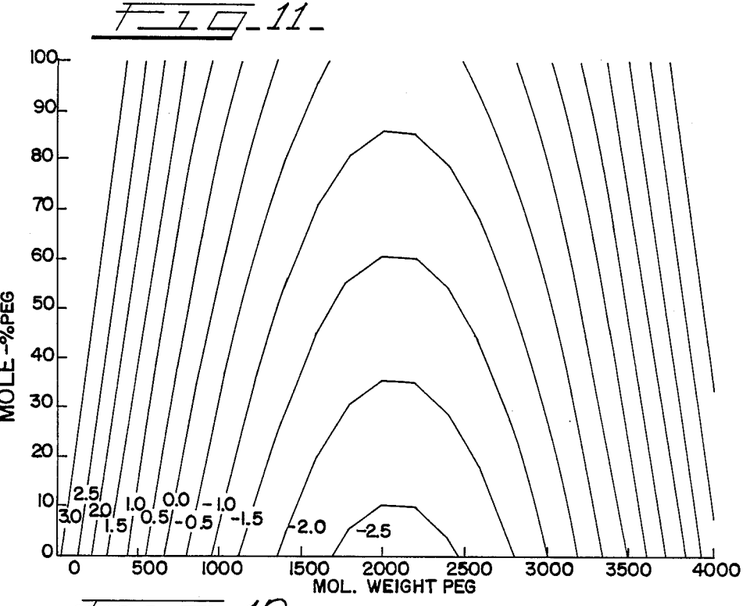
Figure 12:
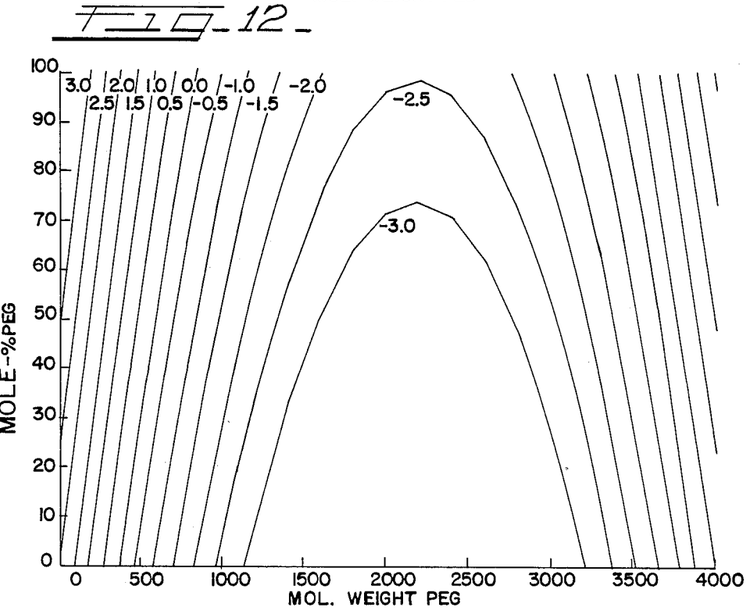
Figure 13:
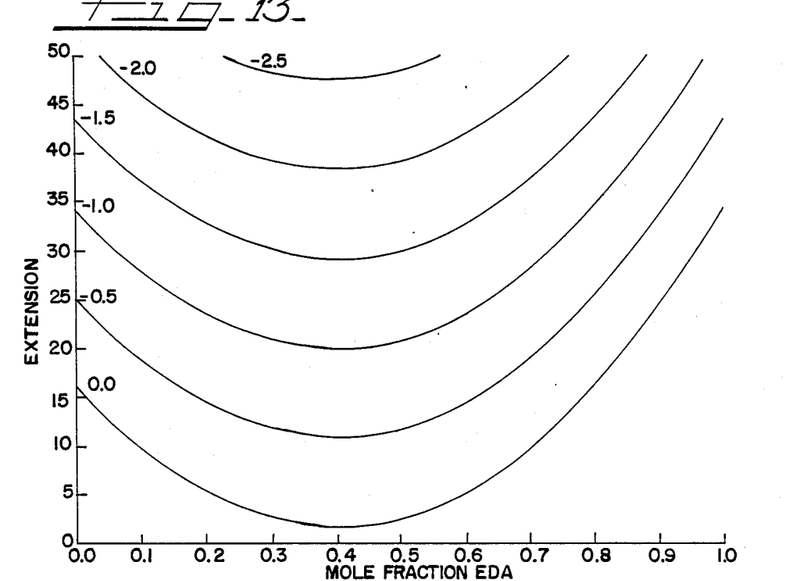
Figure 14:
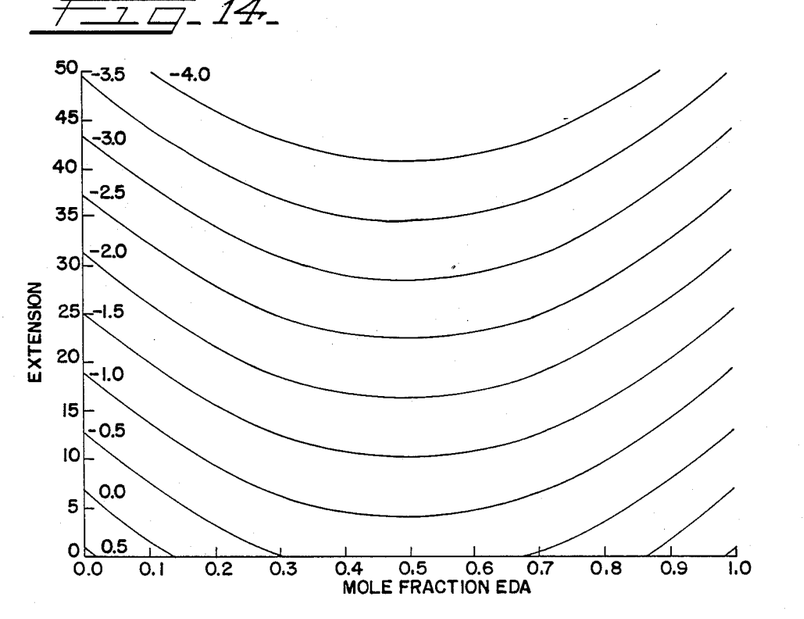
Figure 15:
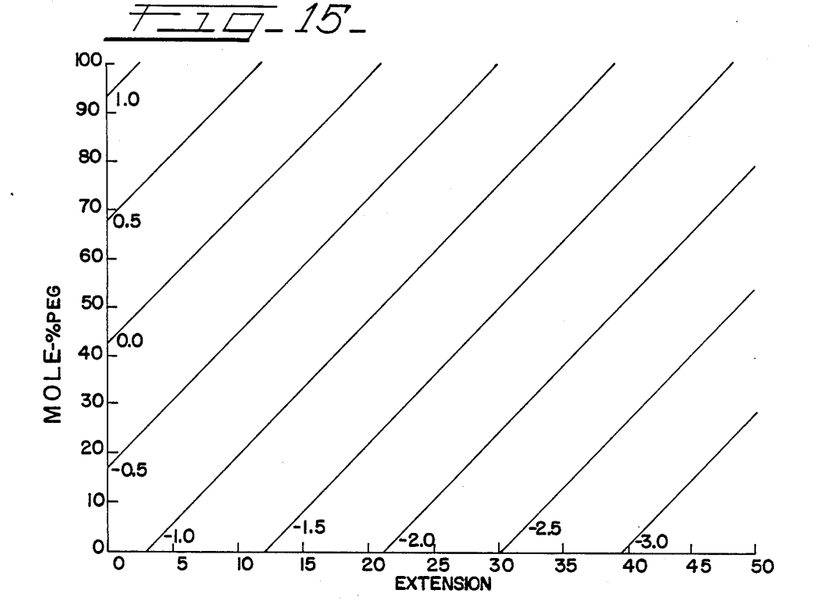

While this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

In the present polyurethane-ureas the level of "pseudo crosslinking" and general phase separation present can be adjusted in a controllable, predictable fashion. This enables the physical and mechanical properties to be tailored to specific requirements. The modification of these materials has been accomplished by controlling the following parameters.

The "soft" block of the resins of the present invention is ideally a relatively low melting point polyether of low molecular weight. The "hard" block is ideally formed from the diurethane linkages resulting from the reaction of two polyether molecules and the urethane/urea segments formed from the reaction of diisocyanate and/or an alkanolamine and a diamine.

The stoichiometry of the polyurethane-ureas of the present invention is such that the "soft" blocks are of relatively greater block length than the corresponding "hard" blocks. In fact, the "hard" blocks can be better characterized as "hard" units as they are present in limited numbers and are of relatively short block length. This situation ensures that little true crystallization of the "hard" block can take place. Crystallization of the "soft" block is possible, but produces less rigid crystallites than those potentially formed from the "hard" blocks. The stoichiometry of the diamines and alkanolamines used in the chain extension of these polyurethane-ureas allows adjustment of the degree and distribution of hydrogen bonding in the produced polymers.

The polyurethane-ureas of the present invention, while encompassing traditional theories, depart, however, from the currently held views regarding phase separation, hydrogen bonding, etc. This departure can be seen clearly in the current polyurethane-urea's mechanical properties after equilibration in a series of organic and aqueous solutions as will be described in greater detail hereinbelow.

As previously described, conventional polyurethanes obtain their mechanical properties from "pseudo crosslinks". These crosslinks are considered to be a function of the level of hydrogen bonding between the various polar groups present in the polymer's structure. The placement of these polar groups and, therefore, hydrogen bonds is accepted as being predominately in the "hard" blocks of the polymer (i.e., associated wth the urethane and urea linkages).

Contributions to the strength of the material from the "soft" block portions are considered negligible by conventional theories. It would be expected, therefore, that an equilibration with a liquid which disrupts hydrogen bonds (e.g., water) would reduce the polymer's mechanical strength and elongation. However, such a reduction in mechanical strength and elongation for polyurethane-ureas of the present invention is not observed when these polyurethane-ureas are equilibrated with water. In fact, the contrary is found to be the case. The polyurethane-ureas of the present invention increase in tensile strength and elongation when wet with water.

While not wishing to be bound by a particular theory, it is believed that the polymers of the present invention behave as follows. Water, being a small, highly polar molecule, is known to participate in "bridging" reactions with various chemical groupings through its hydrogen atom. In the case of the polyurethanes of the present invention, the hydrogen atoms in the water molecules participate in a "bridging" reaction between oxygen atoms in the polyether "soft" block segments. The "soft" blocks are considered to be coiled and the hydrogen "bridging" takes place both between oxygen contained in adjacent loops of the mixed polyether coil and between oxygen present in other surrounding coils (either in the same polymer chain or a second chain). The "bridging" increases the strength of the respective chain which is observed as an increase in mechanical strength of the polymer.

The observed increase in elongation is believed to be due to the changing balance of the inter- to intramolecular "bridging" that is present as the materials are placed under tensile stress. The stress also induces chain slippage which allows alignment and optimization of "bridging" and hydrogen bonding. When equilibrated with a liquid which is not capable of "bridging" (e.g., methanol) the polyurethane-ureas of the present invention do not show an increase in mechanical properties. As a matter of fact, decrease in tensile strength and elongation is observed as compared with dry samples of the same materials. The observed decrease is considered to be due to methanol's effect on the balance of "pseudo crosslinking" and "pseudo crystallinity".

The present segmented polyurethane-urea resins are the reaction products of certain isocyanate-terminated prepolymers with certain amounts of chain extenders or chain extender mixtures. The aforementioned prepolymers, in turn, are the products of the reaction of a stoichiometric excess of a diisocyanate with an admixture of polyalkylene ether glycols having repeating alkyleneoxy groups of different size, i.e., the length of repeating alkylene units is different in each of the glycols. The preferred mol ratio of diisocyanate-to-polyalkylene ether glycol mixture is about 3:2. The prepolymer contains no residual hydroxyl groups.

Any of a wide variety of organic diisocyanates may be utilized for present purposes, including aromatic, aliphatic and cycloaliphatic diisocyanates and combinations thereof. Representative diisocyanates include toluene diisocyanate (TDI), diphenylmethylene diisocyanate (MDI), hexamethylene diisocyanate, cyclohexylene diisocyanate, methylene dicyclohexane diisocyanate, 2,2,4-trimethyl hexamethylene diisocyanate, isophorone diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate and 1,4-cyclohexylene diisocyanate. The preferred diisocyanates are aromatic in nature, e.g., TDI, MDI, and the like.

The polyalkylene ether glycols that constitute an admixture suitable for the present purposes are chosen so that the repeating alkyleneoxy segments in each of the glycols is of a different size. The polyalkylene ether glycol having the relatively shorter alkyleneoxy segments preferably has a number average molecular weight in the range of about 1,000 to about 3,000. The polyalkylene ether glycol having the relatively longer alkyleneoxy segments has a number average molecular weight of at least about 800, and the molecular weight can be as high as about 4,000. Preferably the polyalkylene ether glycols that constitute the admixture have substantially the same number average molecular weight, more preferably a number average molecular weight of about 2,000.

It is also preferable that the polyalkylene ether glycol having the relatively shorter alkyleneoxy segments constitutes at least about 10 mole percent of the admixture, and the polyalkylene ether glycol having the relatively longer alkyleneoxy segments constitutes a major portion of the admixture, i.e., more than about 50 mole percent of the glycol admixture. Particularly preferred are polyalkylene ether glycol admixtures containing about 25 mole percent of the glycol having the relatively shorter alkyleneoxy segments and about 75 mole percent of the glycol having the relatively longer alkyleneoxy segments.

Illustrative of the polyalkylene ether glycol admixtures useful in the formation of the prepolymer are polyethylene glycol with polytetramethylene glycol, polypropylene glycol with 1,2-polydimethylethylene glycol, polydecamethylene glycol with polyethylene glycol, and the like. A preferred polyalkylene ether glycol admixture is that of polytetramethylene glycol and polyethylene glycol. For films suitable for use in wound dressings, a preferred combination is polytetramethylene glycol (PTMEG) having a number average molecular weight of about 2,000 and polyethylene glycol (PEG) having a number average molecular weight of about 2,000 in a mole ratio of about 1:1 to about 3:1, respectively, for an optimum degree of hydrophilicity in combination with a desired degree of hydrogen bonding in the produced film.

The formation of the isocyanate terminated prepolymer occurs in a liquid state and at a temperature of about 50 to about 100° C., preferably at about 80 to about 85° C. The reaction time is about 1 to about 1 ½ hours. Although it is preferred that this reaction take place in a melt, it may equally well be carried out in solution using a suitable solvent such as dimethylacetamide (DMAC), dimethylformamide (DMF), tetrahydrofuran (THF), or the like. The preferred solvent is DMAC. If the reaction takes place in the melt, the prepolymer is then dissolved in the aforementioned solvent.

When dissolution is complete, the prepolymer is chain extended to the desired number average molecular weight, usually in the range of about 20,000 to about 260,000, using a difunctional chain extender, preferably an admixture of such chain extenders. In the chain extender admixture at least one chain extender is an aliphatic diamine and at least one other chain extender is an alkanolamine.

Suitable aliphatic diamine chain extenders include ethylene diamine, m-xylylene diamine, propylene diamine, and the like. Suitable alkanolamine chain extenders include ethanolamine, and the like. Other chain extenders such as diols can also be present. A preferred combination of chain extenders is ethylene diamine with ethanolamine. The mol ratio of ethylene diamine to ethanolamine can be about 0.25:0.75 to about 0.75:0.25.

A preferred monofunctional amine chain control agent includes at least one member of the group consisting of 3,3-dimethylbutylamine, dimethylcyclohexylamine, 1,5-dimethylhexylamine, and dimethylethylene diamine. The amount of the chain control agent is dependent on the amount of NCO-groups present in the prepolymer and the desired chain extension. In any particular case, sufficient chain control agent is added to react with the remaining NCO-groups present after the desired degree of chain extension has been achieved.

The chain extender and chain control agent are dissolved in a suitable solvent such as DMAC, DMF, THF, etc. as mentioned hereinabove.

The prepolymer is then reacted with the chain extender and chain control agent solution to obtain the desired chain extension of the prepolymer. This reaction is usually carried out at a temperature of about 80 to about 85° C. over a time period of about 2 to about 3 ½ hours. A polyurethane-urea resin solution is thus produced.

Optionally, the hydrophilicity of the polyurethane resin may be enhanced by the use of an extrinsic wetting agent such as polyvinylpyrrolidone or the like, which is added to the polymerized resin prior to film forming. The amount of polyvinylpyrrolidone utilized for this purpose is about 1 to about 50 percent by weight of the composition.

The following examples illustrate typical preparations of polyurethane-ureas embodying the present invention. In these examples, the polyurethane-urea prepolymer was prepared in a suitable reactor vessel equipped with an agitator, a temperature sensor, a temperature control and a nitrogen source and bleed. The chain extenders and chain control agents were admixed in a separate mixing vessel and the resulting admixture was then added to the reactor vessel.

EXAMPLE 1

Polytetramethylene glycol (M.W. 1000; 257.14 grams) and polyethylene glycol (M.W. 1000; 28.57 grams) were combined and melted at a temperature of approximately 40 to 45° C. in the reactor under a nitrogen blanket. 4,4'-Diphenylmethane diisocyanate (117.86 grams) was added to the reactor under agitation. The resulting mixture was stirred, heated to a temperature of about 60 to 65° C. and maintained within this temperature range for a time period of about 1 to about 1 ½ hours to produce a molten prepolymer. Dry dimethylacetamide (DMAC; 857.59 grams) was then added to the molten prepolymer and the admixture was stirred until dissolution of the prepolymer was complete. This occurred in about 15 to about 30 minutes.

Dry DMAC (350.0 grams), ethanolamine (4.68 grams), ethylene diamine (4.60 grams) and dimethylethylene diamine (0.88 grams) were combined in a separate vessel, mixed at room temperature, and then added rapidly to the prepolymer solution with vigorous agitation. Thereafter, the prepolymer solution containing these additives was maintained at a temperature of approximately 80 to 85 ° C. for a time period of about 2 to about 3 ½ hours.

The resultant polyurethane resin solution was colorless and viscous, and was cast into a visually clear film.

EXAMPLE 2

Polytetramethylene glycol (M.W. 1000; 214.29 grams) and polyethylene glycol (M.W. 1000; 71.43 grams) were combined and melted at a temperature of approximately 40 to 45° C. in the reactor under a nitrogen blanket. 4,4'-Diphenylmethane diisocyanate (117.86 grams) was added to the reactor under agitation. The resulting mixture was stirred, heated to a temperature of about 60 to 65° C. and maintained within this temperature range for a time period of about 1 to about 1 ½ hours. Dry dimethylacetamide (DMAC; 857.59 grams) was then added to the molten prepolymer and the admixture was stirred until dissolution of the prepolymer was complete. This occurred in about 15 to about 30 minutes.

Dry DMAC (350.0 grams), ethanolamine (4.86 grams), ethylene diamine (4.77 grams) and dimethylethylene diamine (0.92 grams) were combined together in a separate vessel, mixed at room temperature, and then added rapidly to the prepolymer solution with vigorous agitation. Thereafter, the prepolymer solution containing the additives was maintained at a temperature of approximately 80 to 85° C. for a time period of about 2 to about 3 ½ hours.

The resultant polyurethane resin solution was colorless and viscous, and was cast into a visually clear film.

EXAMPLE 3

Polytetramethylene glycol (M.W. 1000; 142.86 grams) and polyethylene glycol (M.W. 1000; 142.86 grams) were combined and melted at a temperature of approximately 40 to 45° C. in the reactor under a nitrogen blanket. 4,4'-Diphenylmethane diisocyanate (117.86 grams) was added to the reactor under agitation. The resulting mixture was stirred, heated to a temperature of about 60 to 65° C. and maintained within this temperature range for a time period of about 1 to about 1 ½ hours to produce a molten prepolymer. Dry dimethylacetamide (DMAC; 857.59 grams) was then added to the molten prepolymer and the admixture was stirred until dissolution of the prepolymer was complete. This occurred in about 15 to about 30 minutes.

Dry DMAC (350.0 grams), ethanolamine (4.47 grams), ethylene diamine (4.49 grams) and dimethylethylene diamine (0.84 grams) were combined together in a separate vessel, mixed at room temperature, and then added rapidly to the prepolymer solution with vigorous agitation. Thereafter, the prepolymer solution containing these additives was maintained at a temperature of approximately 80 to 85° C. for a time period of about 2 to about 3 ½ hours.

The resultant polyurethane resin solution was colorless and viscous, and was cast into a visually clear film.

EXAMPLE 4

Polytetramethylene glycol (M.W. 1000; 71.43 grams) and polyethylene glycol (M.W. 1000; 214.29 grams) were combined and melted at approximately 40 to 45° C. in the reactor under a nitrogen blanket. 4,4'-Diphenylmethane diisocyanate (117.86 grams) was added to the reactor under agitation. The resulting mixture was stirred, heated to a temperature of about 60 to 65° C. and maintained within this temperature range for a time period of about 1 to about 1 ½ hours to produce a molten prepolymer. Dry dimethylacetamide (DMAC; 857.61 grams) was then added to the molten prepolymer and the admixture was stirred until dissolution of the prepolymer was complete. This occurred in about 15 to about 30 minutes.

Dry DMAC (350.0 grams), ethanolamine (4.34 grams), ethylene diamine (4.27 grams) and dimethylethylene diamine (0.82 grams) were combined in a separate vessel, mixed at room temperature, and then added rapidly to the prepolymer solution with vigorous agitation. Thereafter, the prepolymer solution containing these additives was maintained at a temperature of approximately 80 to 85° C. for a time period of about 2 to about 3 ½ hours.

The resultant polyurethane resin solution was colorless and viscous, and was cast into a visually clear film.

In a manner similar to that of the foregoing examples, additional polyurethane-ureas embodying this invention were prepared and the physical properties thereof noted. The amounts of reactants used and the properties noted are set forth in the Tables hereinbelow.

TABLE I

COMPOSITION AND PHYSICAL CHARACTERISTICS OF THE PREPOLYMER

| SAMPLE | % PEG[1] | MWT PEG[2] | MWT PTMEG[3] | CHAIN EXTENSION[4] | % NCO[5] | VISCOSITY (CPS) | MOLE FRACTION EDA |
|---|---|---|---|---|---|---|---|
| 001 | 75 | 1000 | 1000 | 40 | 1.090 | 3400 | 0.25 |
| 002 | 50 | 1000 | 1000 | 10 | 1.050 | 390 | 0.25 |
| 003 | 25 | 1000 | 1000 | 20 | 1.070 | 2460 | 0.25 |
| 004 | 75 | 1000 | 1000 | 10 | 1.020 | 900 | 0.75 |
| 005 | 25 | 1000 | 1000 | 40 | 1.070 | 14480 | 0.75 |
| 006 | 50 | 1000 | 1000 | 20 | 1.040 | 5010 | 0.75 |
| 007 | 75 | 1000 | 1000 | 20 | 0.980 | 3060 | 0.50 |
| 008 | 50 | 1000 | 1000 | 40 | 1.040 | 13680 | 0.50 |
| 009 | 25 | 1000 | 1000 | 10 | 1.050 | 2160 | 0.50 |
| 010 | 25 | 1000 | 650 | 20 | 1.300 | 2810 | 0.50 |
| 011 | 50 | 1000 | 650 | 10 | 1.190 | 890 | 0.50 |
| 012 | 75 | 1000 | 650 | 40 | 1.080 | 16840 | 0.50 |
| 013 | 75 | 1000 | 650 | 10 | 1.090 | 630 | 0.25 |
| 014 | 25 | 1000 | 650 | 40 | 1.280 | 11320 | 0.75 |
| 015 | 50 | 1000 | 650 | 20 | 1.190 | 2610 | 0.25 |
| 016 | 50 | 1000 | 650 | 40 | 1.220 | 3970 | 0.50 |
| 017 | 25 | 1000 | 650 | 40 | 1.340 | 5100 | 0.25 |
| 018 | 25 | 1000 | 650 | 10 | 1.340 | 1590 | 0.75 |
| 019 | 50 | 1000 | 650 | 40 | 1.190 | 9640 | 0.75 |
| 020 | 75 | 1000 | 650 | 20 | 1.120 | 1240 | 0.75 |
| 021 | 50 | 1000 | 2000 | 20 | 0.820 | 1450 | 0.50 |
| 022 | 25 | 1000 | 2000 | 40 | 0.780 | 8220 | 0.50 |
| 023 | 75 | 1000 | 2000 | 10 | 0.910 | 790 | 0.50 |
| 024 | 75 | 1000 | 2000 | 40 | 0.930 | 1600 | 0.75 |
| 025 | 50 | 1000 | 2000 | 10 | 0.860 | 6300 | 0.75 |
| 026 | 25 | 1000 | 2000 | 10 | 0.740 | 1880 | 0.25 |
| 027 | 50 | 1000 | 1000 | 20 | 1.060 | 3560 | 0.50 |
| 028 | 25 | 1000 | 2000 | 20 | 0.920 | 1320 | 0.75 |
| 029 | 50 | 1000 | 1000 | 20 | 1.060 | 1530 | 0.50 |
| 030 | 75 | 1000 | 2000 | 20 | 0.790 | 4350 | 0.25 |
| 031 | 50 | 1000 | 1000 | 20 | 0.900 | 1410 | 0.50 |
| 032 | 50 | 1000 | 2000 | 40 | 0.800 | 10060 | 0.25 |
| 033 | 50 | 1000 | 1000 | 20 | 1.070 | 2860 | 0.50 |
| 034 | 25 | 600 | 650 | 10 | 1.420 | 690 | 0.25 |
| 035 | 50 | 600 | 1000 | 10 | 1.110 | 7000 | 0.50 |
| 036 | 75 | 600 | 2000 | 10 | 0.900 | 1780 | 0.75 |
| 037 | 50 | 600 | 650 | 40 | 1.260 | 2770 | 0.25 |
| 038 | 25 | 600 | 1000 | 20 | 1.150 | 4590 | 0.50 |
| 039 | 75 | 600 | 1000 | 40 | 1.110 | 7440 | 0.50 |
| 040 | 50 | 600 | 2000 | 20 | 0.850 | 7540 | 0.75 |
| 041 | 25 | 600 | 2000 | 40 | 0.760 | 23700 | 0.75 |
| 042 | 25 | 600 | 1000 | 40 | 1.190 | 11440 | 0.25 |
| 043 | 75 | 600 | 650 | 20 | 1.310 | 1180 | 0.25 |
| 044 | 50 | 600 | 2000 | 40 | 0.820 | 6300 | 0.50 |
| 045 | 50 | 600 | 1000 | 40 | 1.170 | 4940 | 0.75 |
| 046 | 50 | 600 | 1000 | 20 | 1.130 | 3900 | 0.25 |
| 047 | 75 | 600 | 1000 | 10 | 1.120 | 2990 | 0.25 |
| 048 | 75 | 600 | 1000 | 20 | 1.540 | 5610 | 0.75 |
| 049 | 25 | 600 | 1000 | 10 | 1.130 | 2130 | 0.75 |
| 050 | 50 | 600 | 2000 | 10 | 0.880 | 1640 | 0.25 |
| 051 | 75 | 600 | 2000 | 40 | 1.010 | 5090 | 0.25 |
| 052 | 25 | 600 | 2000 | 20 | 0.720 | 5790 | 0.25 |
| 053 | 25 | 600 | 2000 | 10 | 0.750 | 4050 | 0.50 |
| 054 | 75 | 600 | 2000 | 20 | 0.950 | 2780 | 0.50 |
| 055 | 75 | 600 | 650 | 40 | 1.070 | 7510 | 0.75 |
| 056 | 25 | 600 | 650 | 10 | 1.370 | 1690 | 0.75 |
| 057 | 50 | 600 | 650 | 10 | 1.270 | 1480 | 0.75 |
| 058 | 50 | 600 | 650 | 20 | 1.310 | 2300 | 0.50 |

TABLE I-continued

COMPOSITION AND PHYSICAL CHARACTERISTICS OF THE PREPOLYMER

| SAMPLE | % PEG[1] | MWT PEG[2] | MWT PTMEG[3] | CHAIN EXTENSION[4] | % NCO[5] | VISCOSITY (CPS) | MOLE FRACTION EDA |
|---|---|---|---|---|---|---|---|
| 059 | 75 | 600 | 650 | 10 | 1.220 | 620 | 0.50 |

[1]Mole percent of polyethylene glycol present based on the polyalkylene glycols present in the composition.
[2]Number average molecular weight of the polyethylene glycol.
[3]Number average molecular weight of the polytetramethylene glycol.
[4]Number of folds by which the prepolymer was chain extended.
[5]Percent NCO-groups in the prepolymer.

TABLE II

| | DRY PROPERTIES[1] | | WET PROPERTIES[1] | | MOISTURE VAPOR TRANSPORT RATE (g/m$^2$/24 hrs) | | |
|---|---|---|---|---|---|---|---|
| SAMPLE | TENSILE STRENGTH (kg/mm$^2$) | PERCENT ELONGATION | TENSILE STRENGTH (kg/mm$^2$) | PERCENT ELONGATION | INVERTED CUP[2] | NON-INVERTED CUP[3] | WATER ABSORPTION (%) |
| 001 | 0.43 | 1035 | 0.45 | 764 | 9744 | 3312 | 67.4 |
| 002 | 0.28 | 200 | 0.26 | 152 | 5736 | 1080 | 42.4 |
| 003 | 1.67 | 1000 | 1.65 | 902 | 1344 | 1056 | 15.4 |
| 004 | 0.69 | 475 | 0.36 | 210 | 13896 | 2568 | 66.0 |
| 005 | 5.30 | 875 | 4.81 | 855 | 1032 | 1032 | 12.2 |
| 006 | 3.10 | 1090 | 1.92 | 750 | 4272 | 1584 | 31.4 |
| 007 | 0.55 | 890 | 0.57 | 726 | 17700 | 2568 | 69.3 |
| 008 | 5.28 | 775 | 6.70 | 793 | 2280 | 888 | 3.8 |
| 009 | 2.38 | 745 | 3.40 | 782 | 2496 | 816 | 3.7 |
| 010 | 2.02 | 650 | 1.09 | 400 | 3000 | 816 | 20.9 |
| 011 | 0.51 | 480 | 0.69 | 634 | 5448 | 1464 | 40.0 |
| 012 | 1.75 | 1300 | 1.51 | 948 | 12168 | 2664 | 64.6 |
| 013 | 0.11 | 180 | 0.08 | 91 | 19152 | 2448 | 77.5 |
| 014 | 6.10 | 775 | 3.43 | 693 | 912 | 768 | 17.0 |
| 015 | 0.70 | 1040 | 0.52 | 574 | 5112 | 1536 | 43.3 |
| 016 | 1.78 | 995 | 0.32 | 826 | 4584 | 1608 | 38.2 |
| 017 | 3.95 | 830 | 1.77 | 694 | 984 | 864 | 21.0 |
| 018 | 1.75 | 620 | 1.66 | 673 | 936 | 816 | 20.0 |
| 019 | 3.92 | 900 | 3.97 | 850 | 3888 | 1728 | 36.6 |
| 020 | 0.77 | 625 | 0.93 | 632 | 13428 | 2568 | 58.3 |
| 021 | 0.93 | 860 | 1.52 | 850 | 5304 | 1752 | 34.5 |
| 022 | 3.33 | 1015 | 3.67 | 941 | 1968 | 1056 | 10.2 |
| 023 | 0.35 | 575 | 0.62 | 681 | 9144 | 2280 | 55.2 |
| 024 | 1.52 | 950 | 1.74 | 853 | 7512 | 1416 | 25.4 |
| 025 | 2.19 | 1005 | 1.99 | 838 | 9696 | 2088 | 49.0 |
| 026 | 1.80 | 1250 | 2.11 | 1109 | 1344 | 1800 | 8.4 |
| 027 | 1.35 | 1075 | 1.61 | 883 | 6504 | 1392 | 35.5 |
| 028 | 2.25 | 785 | 2.11 | 687 | 1296 | 1248 | 11.6 |
| 029 | 0.78 | 895 | 0.81 | 742 | 4176 | 1560 | 38.2 |
| 030 | 0.80 | 2370 | 2.54 | 1390 | 8184 | 2496 | 70.1 |
| 031 | 1.49 | 1162 | 1.47 | 1021 | 4488 | 1344 | 40.6 |
| 032 | 3.73 | 1100 | 3.67 | 1057 | 4056 | 1128 | 11.6 |
| 033 | 1.28 | 985 | 1.32 | 875 | 5424 | 1896 | 39.2 |
| 034 | 2.54 | 630 | 0.56 | 266 | 912 | 576 | 7.1 |
| 035 | 1.32 | 830 | 0.76 | 559 | 960 | 912 | 14.6 |
| 036 | 2.57 | 874 | 2.28 | 771 | 2112 | 1248 | 4.8 |
| 037 | 7.40 | 690 | 2.60 | 711 | 4680 | 1248 | 15.6 |
| 038 | 4.35 | 795 | 3.61 | 690 | 1104 | 936 | 8.4 |
| 039 | 6.94 | 875 | 1.33 | 562 | 1584 | 1296 | 20.5 |
| 040 | 5.20 | 910 | 4.43 | 818 | 1344 | 1176 | 9.2 |
| 041 | 5.44 | 885 | 4.50 | 801 | 2832 | 1104 | 1.9 |
| 042 | 5.61 | 835 | 4.74 | 828 | 1920 | 816 | 6.5 |
| 043 | 1.56 | 710 | 0.44 | 234 | 1327 | 767 | 27.4 |
| 044 | 3.73 | 910 | 4.27 | 945 | 1560 | 1536 | 3.4 |
| 045 | 4.00 | 720 | 2.58 | 697 | 1128 | 1032 | 13.2 |
| 046 | 3.60 | 925 | 2.25 | 832 | 2160 | 1104 | 10.3 |
| 047 | 1.83 | 1175 | 1.00 | 868 | 1968 | 1056 | 29.4 |
| 048 | 6.49 | 670 | 3.47 | 591 | 6504 | 936 | 9.6 |
| 049 | 2.69 | 815 | 3.43 | 786 | 1056 | 792 | 6.5 |
| 050 | 2.40 | 1034 | 1.30 | 831 | 6552 | 2208 | 10.2 |
| 051 | 2.51 | 1260 | 1.64 | 881 | 1872 | 1392 | 24.3 |
| 052 | 2.58 | 1215 | 3.53 | 1124 | 1320 | 1536 | 5.1 |
| 053 | 2.49 | 1045 | 2.91 | 938 | 5232 | 1224 | 5.1 |
| 054 | 2.87 | 945 | 2.13 | 821 | 2280 | 1320 | 18.4 |
| 055 | 6.45 | 725 | 2.29 | 683 | 3192 | 1104 | 20.9 |
| 056 | 4.38 | 605 | 2.96 | 673 | 2352 | 552 | 6.8 |
| 057 | 4.04 | 670 | 1.51 | 588 | 1320 | 816 | 12.6 |
| 058 | 4.13 | 655 | 1.74 | 652 | 960 | 744 | 17.6 |

TABLE II-continued

| SAMPLE | DRY PROPERTIES[1] | | WET PROPERTIES[1] | | MOISTURE VAPOR TRANSPORT RATE (g/m²/24 hrs) | | WATER ABSORPTION (%) |
|---|---|---|---|---|---|---|---|
| | TENSILE STRENGTH (kg/mm²) | PERCENT ELONGATION | TENSILE STRENGTH (kg/mm²) | PERCENT ELONGATION | INVERTED CUP[2] | NON-INVERTED CUP[3] | |
| 059 | 0.00 | 0 | 0.46 | 236 | 2283 | 1118 | 5.7 |

[1]At break.
[2]ASTM Test No. E-96-80.
[3]Modified ASTM Test No. E-96-80 by use of elevated temperature (37° C.).

TABLE III

TENSILE STRENGTH AT BREAK (kg/mm²)

| SAMPLE | DRY | WET | DIFFERENCE[1] | PERCENT CHANGE[2] |
|---|---|---|---|---|
| 001 | 0.43 | 0.45 | −0.02 | −4.65 |
| 002 | 0.28 | 0.26 | 0.02 | 7.14 |
| 003 | 1.67 | 1.65 | 0.02 | 1.20 |
| 004 | 0.69 | 0.36 | 0.33 | 47.83 |
| 005 | 5.30 | 4.81 | 0.49 | 9.25 |
| 006 | 3.10 | 1.92 | 1.18 | 38.06 |
| 007 | 0.55 | 0.57 | −0.02 | −3.64 |
| 008 | 5.28 | 6.70 | −1.42 | −26.89 |
| 009 | 2.38 | 3.40 | −1.02 | −42.86 |
| 010 | 2.02 | 1.09 | 0.93 | 46.04 |
| 011 | 0.51 | 0.69 | −0.18 | −35.29 |
| 012 | 1.75 | 1.51 | 0.24 | 13.71 |
| 013 | 0.11 | 0.08 | 0.03 | 27.27 |
| 014 | 6.10 | 3.43 | 2.67 | 43.77 |
| 015 | 0.70 | 0.52 | 0.18 | 25.71 |
| 016 | 1.78 | 0.32 | 1.46 | 82.02 |
| 017 | 3.95 | 1.77 | 2.18 | 55.19 |
| 018 | 1.75 | 1.66 | 0.09 | 5.14 |
| 019 | 3.92 | 3.97 | −0.05 | −1.28 |
| 020 | 0.77 | 0.93 | −0.16 | −20.78 |
| 021 | 0.93 | 1.52 | −0.59 | −63.44 |
| 022 | 3.33 | 3.67 | −0.34 | −10.21 |
| 023 | 0.35 | 0.62 | −0.27 | −77.14 |
| 024 | 1.52 | 1.74 | −0.22 | −14.47 |
| 025 | 2.19 | 1.99 | 0.20 | 9.13 |
| 026 | 1.80 | 2.11 | −0.31 | −17.22 |
| 027 | 1.35 | 1.61 | −0.26 | −19.26 |
| 028 | 2.25 | 2.11 | 0.14 | 6.22 |
| 029 | 0.78 | 0.81 | −0.03 | −3.85 |
| 030 | 0.80 | 2.54 | −1.74 | −217.50 |
| 031 | 1.49 | 1.47 | 0.02 | 1.34 |
| 032 | 3.93 | 3.67 | 0.26 | 6.62 |
| 033 | 1.28 | 1.32 | −0.04 | −3.13 |
| 034 | 2.54 | 0.56 | 1.98 | 77.95 |
| 035 | 1.32 | 0.76 | 0.56 | 42.42 |
| 036 | 2.57 | 2.28 | 0.29 | 11.28 |
| 037 | 7.40 | 2.60 | 4.80 | 64.86 |
| 038 | 4.35 | 3.61 | 0.74 | 17.01 |
| 039 | 6.94 | 1.33 | 5.61 | 80.84 |
| 040 | 5.20 | 4.43 | 0.77 | 14.81 |
| 041 | 5.44 | 4.50 | 0.94 | 17.28 |
| 042 | 5.61 | 4.74 | 0.87 | 15.51 |
| 043 | 1.56 | 0.44 | 1.12 | 71.79 |
| 044 | 3.73 | 4.27 | 0.54 | 14.48 |
| 045 | 4.00 | 2.58 | 1.42 | 35.50 |
| 046 | 3.60 | 2.25 | 1.35 | 37.50 |
| 047 | 1.83 | 1.00 | 0.83 | 45.36 |
| 048 | 6.49 | 3.47 | 3.02 | 46.53 |
| 049 | 2.69 | 3.43 | −0.74 | −27.51 |
| 050 | 2.40 | 1.30 | 1.10 | 45.83 |
| 051 | 2.51 | 1.64 | 0.87 | 34.66 |
| 052 | 2.58 | 3.53 | −0.95 | −36.82 |
| 053 | 2.49 | 2.91 | −0.42 | −16.87 |
| 054 | 2.87 | 2.13 | 0.74 | 25.78 |
| 055 | 6.45 | 2.29 | 4.16 | 64.50 |
| 056 | 4.38 | 2.96 | 1.42 | 32.42 |
| 057 | 4.04 | 1.51 | 2.53 | 62.62 |
| 058 | 4.13 | 1.74 | 2.39 | 57.87 |
| 059 | 0.00 | 0.46 | −0.46 | 0.00 |

[1]Difference = Dry − Wet
[2]Percent Change = $\frac{100 \times \text{Difference}}{\text{Dry}}$;
positive numbers indicate a decrease in tensile strength after wetting with water; negative numbers indicate an increase in tensile strength after wetting with water.

TABLE IV

PERCENT ELONGATION AT BREAK

| SAMPLE | DRY | WET | DIFFERENCE[1] | PERCENT CHANGE[2] |
|---|---|---|---|---|
| 001 | 1035.0 | 764.0 | 271.0 | 26.2 |
| 002 | 200.0 | 152.0 | 48.0 | 24.0 |
| 003 | 1000.0 | 902.0 | 98.0 | 9.8 |
| 004 | 475.0 | 210.0 | 265.0 | 55.8 |
| 005 | 875.0 | 855.0 | 20.0 | 2.3 |
| 006 | 1090.0 | 750.0 | 340.0 | 31.2 |
| 007 | 890.0 | 726.0 | 164.0 | 18.4 |
| 008 | 775.0 | 793.0 | −18.0 | −2.3 |
| 009 | 745.0 | 782.0 | −37.0 | −5.0 |
| 010 | 650.0 | 400.0 | 250.0 | 38.5 |
| 011 | 480.0 | 634.0 | −154.0 | −32.1 |
| 012 | 1300.0 | 948.0 | 352.0 | 27.1 |
| 013 | 180.0 | 91.0 | 89.0 | 49.4 |
| 014 | 775.0 | 693.0 | 82.0 | 10.6 |
| 015 | 1040.0 | 574.0 | 466.0 | 44.8 |
| 016 | 995.0 | 826.0 | 169.0 | 17.0 |
| 017 | 830.0 | 694.0 | 136.0 | 16.4 |
| 018 | 620.0 | 673.0 | −53.0 | −8.5 |
| 019 | 900.0 | 850.0 | 50.0 | 5.6 |
| 020 | 625.0 | 632.0 | −7.0 | −1.1 |
| 021 | 860.0 | 850.0 | 10.0 | 1.2 |
| 022 | 1015.0 | 941.0 | 74.0 | 7.3 |
| 023 | 575.0 | 681.0 | −106.0 | −18.4 |
| 024 | 950.0 | 853.0 | 97.0 | 10.2 |
| 025 | 1005.0 | 838.0 | 167.0 | 16.6 |
| 026 | 1250.0 | 1109.0 | 141.0 | 11.3 |
| 027 | 1075.0 | 883.0 | 192.0 | 17.9 |
| 028 | 785.0 | 687.0 | 98.0 | 12.5 |
| 029 | 895.0 | 742.0 | 153.0 | 17.1 |
| 030 | 2370.0 | 1390.0 | 980.0 | 41.4 |
| 031 | 1162.0 | 1021.0 | 141.0 | 12.1 |
| 032 | 1100.0 | 1057.0 | 43.0 | 3.9 |
| 033 | 985.0 | 875.0 | 110.0 | 11.2 |
| 034 | 630.0 | 266.0 | 364.0 | 57.8 |
| 035 | 830.0 | 559.0 | 271.0 | 32.7 |
| 036 | 874.0 | 771.0 | 103.0 | 11.8 |
| 037 | 690.0 | 711.0 | −21.0 | −3.0 |
| 038 | 795.0 | 690.0 | 105.0 | 13.2 |
| 039 | 875.0 | 562.0 | 313.0 | 35.8 |
| 040 | 910.0 | 818.0 | 92.0 | 10.1 |
| 041 | 885.0 | 801.0 | 84.0 | 9.5 |
| 042 | 835.0 | 828.0 | 7.0 | 0.8 |
| 043 | 710.0 | 234.0 | 476.0 | 67.0 |
| 044 | 910.0 | 945.0 | −35.0 | −3.8 |
| 045 | 720.0 | 697.0 | 23.0 | 3.2 |
| 046 | 925.0 | 832.0 | 93.0 | 10.1 |
| 047 | 1175.0 | 868.0 | 307.0 | 26.1 |
| 048 | 670.0 | 591.0 | 79.0 | 11.8 |
| 049 | 815.0 | 786.0 | 29.0 | 3.6 |
| 050 | 1034.0 | 831.0 | 203.0 | 19.6 |
| 051 | 1260.0 | 881.0 | 379.0 | 30.1 |
| 052 | 1215.0 | 1124.0 | 91.0 | 7.5 |
| 053 | 1045.0 | 930.0 | 107.0 | 10.2 |
| 054 | 945.0 | 821.0 | 124.0 | 13.1 |
| 055 | 725.0 | 683.0 | 42.0 | 5.8 |
| 056 | 605.0 | 673.0 | −68.0 | −11.2 |
| 057 | 670.0 | 588.0 | 82.0 | 12.2 |
| 058 | 655.0 | 652.0 | 3.0 | 0.5 |

TABLE IV-continued

| | PERCENT ELONGATION AT BREAK | | | |
|---|---|---|---|---|
| SAMPLE | DRY | WET | DIFFERENCE[1] | PERCENT CHANGE[2] |
| 059 | 0.0 | 236.0 | −236.0 | 0.0 |

[1]Difference = Dry − Wet
[2]Percent Change = $\frac{100 \times \text{Difference}}{\text{Dry}}$;
positive numbers indicate a decrease in percent elongation after wetting with water; negative numbers indicate an increase in percent elongation after wetting with water.

The polyurethane resins of the present invention are particularly well suited for the manufacture of components for wound dressings and closures inasmuch as the high level of hydrophilicity, and therefore the absorption capacity, inherent in these polymers are important properties in this regard. Environmental wound dressings rely upon being able to absorb wound exudate while maintaining a moist microenvironment at the wound site to obtain optimum healing.

Wounds or injuries to the skin generate varying amounts of discharge fluid known as exudate. Modern wound care management techniques seek to maintain the moisture level at the wound site at a relatively high level. But, excessive build up of exudate is unacceptable. The present polyurethane resins can be tailored to have properties, when cast into films, so as to absorb excess exudate while maintaining a high level of moisture at the wound site.

In addition, the chemical, physical and mechanical properties of the present polyurethanes allow their use in a wide variety of other applications. The material's wet strength properties and selective permeability towards water vapor and other gases are particularly significant in this regard.

The present polymers may be coated onto textile substrates to provide breathability while retaining resistance to liquids, particularly water. In a similar fashion, selectively permeable films may be fabricated for use as containers for desiccants and other absorbent agents (e.g., crystalline aluminosilicates, silica gel, etc.). The use of these films in this application has the advantage of preventing particulate contamination of the article into which the desiccant package will be placed and reduction of efficiency due to nonspecific absorption. Films of these materials are also suitable for packaging. Their selective gaseous and moisture vapor transmission properties allow their application in the area of environmental packaging.

These polymers are biocompatible and noncytotoxic which makes them ideal for medical and biological applications. These properties enable the present polymers to be used as substrates for the support, growth and attachment of biological materials. They are of particular utility in the area of cell growth substrates for mammalian cell culture. The attachment and growth of cells to structures manufactured from these polymers makes them ideal for use in bioreactor systems for large scale production of cell lines, etc. Immobilization of proteins, enzymes and other biologically active materials, while maintaining biological activity, allows the use of these polymers as active structures in biosensors and diagnostic test kits. Similarly, nonbiologically active catalysts may be incorporated in these polymers, thereby facilitating their use in numerous chemical and physical processes.

Selective transport of chemical agents through polymer films fabricated from these polymers can be used in the areas of filtration, separation and purification of liquids and gases. These properties are also of use in the area of drug delivery over an extended time period where therapeutic agents are delivered from a reservoir across a polymer membrane into the physiological environment.

It is also envisaged that these polymers may be used as specialty coatings to inhibit corrosion of metallic surfaces while facilitating selective gaseous transport.

The present segmented polyether polyurethane resins are also useful for the fabrication of vascular grafts, ureters and other biocompatible elements.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

We claim:

1. A hydrophilic but water-insoluble, segmented polyether polyurethane-urea having a wet strength greater than dry strength and capable of forming a visually clear film; said polyurethane-urea being the reaction product of a prepolymer derived from a stoichiometric excess of a diisocyanate reacted with an admixture of polyalkylene ether glycols each having different-length alkyleneoxy segments, and extended with a difunctional amine chain extender.

2. The segmented polyether polyurethane-urea of claim 1 wherein said admixture of polyalkylene ether glycols is constituted by polytetramethylene glycol and polyethylene glycol.

3. The segmented polyether polyurethane-urea of claim 2 wherein polytetramethylene glycol and polyethylene glycol are present in the admixture in a mole ratio of about 3:1.

4. The segmented polyether polyurethane-urea of claim 1 wherein said relatively shorter segment glycol have a molecular weight in the range of about 1000 to about 3,000 and said relatively longer segment glycol has molecular weight of at least about 800.

5. The segmented polyether polyurethane-urea of claim 1 wherein said glycols have a number average molecular weight of about 2000.

6. The segmented polyether polyurethane-urea of claim 1 wherein said glycols have substantially the same number average molecular weight.

7. The segmented polyether polyurethane-urea of claim 6 wherein the polyalkylene ether glycol having the relatively shorter alkyleneoxy segments constitutes at least about 10 mole percent of the admixture and the polyalkylene ether glycol having the relatively longer alkyleneoxy segments constitutes more than about 50 mole percent of the admixture.

8. The segmented polyether polyurethane-urea of claim 1 wherein the polyalkylene ether glycol having the relatively longer alkyleneoxy segments and the polyalkylene ether glycol having the relatively shorter alkyleneoxy segments are present in a mole ratio of about 3:1, respectively.

9. The segmented polyether polyurethane-urea of claim 8 wherein both of said glycols have substantially the same number average molecular weight.

10. The segmented polyether polyurethane-urea of claim 9 wherein said glycols have a number average molecular weight of about 2,000.

* * * * *